United States Patent [19]

Miano et al.

[11] Patent Number: 5,053,136

[45] Date of Patent: Oct. 1, 1991

[54] METHOD FOR THE HETEROGENEOUS CATALYTIC PHOTODEGRADATION OF POLLUTANTS

[75] Inventors: Fausto Miano, Enna; Enrico Borgarello, Turin, both of Italy

[73] Assignee: Eniricerche S.p.A., Milan, Italy

[21] Appl. No.: 579,700

[22] Filed: Sep. 10, 1990

[30] Foreign Application Priority Data

Sep. 15, 1989 [IT] Italy ............................ 21740 A/89

[51] Int. Cl.$^5$ ..................... B01D 61/00; B01S 19/08
[52] U.S. Cl. .................................... 210/650; 210/763; 210/764; 210/908; 422/186; 250/372
[58] Field of Search ............ 210/650, 748, 900, 908, 210/909, 192, 96.1, 638, 763, 192, 664, 764; 250/372; 422/81, 186, 186.3; 328/127

[56] References Cited

U.S. PATENT DOCUMENTS

| | | | |
|---|---|---|---|
| 4,008,398 | 2/1977 | Schramm et al. | 328/127 |
| 4,222,874 | 9/1980 | Connelly | 210/650 |
| 4,478,699 | 10/1984 | Halmann et al. | 422/186 |
| 4,749,657 | 6/1988 | Takahashi et al. | 422/81 |
| 4,780,200 | 10/1988 | Bond et al. | 210/748 |
| 4,788,038 | 11/1988 | Matsunaga | 210/748 |
| 4,888,101 | 12/1989 | Cooper | 422/186 |
| 4,892,712 | 1/1990 | Roberson et al. | 210/763 |

*Primary Examiner*—Robert A. Dawson
*Assistant Examiner*—Ana Fortuna
*Attorney, Agent, or Firm*—Oblon, Spivak, McClelland, Maier & Neustadt

[57] ABSTRACT

A method for purifying water containing pollutant mixtures is described, which uses a reactor containing a semiconductor as reaction catalyst and a lamp which emits radiation having a wavelength of less than 400 nm. The reactor, characterized in that its walls allow water and the pollutant substances to pass through, is immersed in the water to be purified so that the pollutants contained in it reach the reactor interior where they are adsorbed on the semiconductor activated by light radiation, and are then degraded.

14 Claims, No Drawings

METHOD FOR THE HETEROGENEOUS CATALYTIC PHOTODEGRADATION OF POLLUTANTS

This invention relates to a method for purifying water containing pollutant mixtures consisting of immersing into said water a reactor containing a semiconductor and a lamp which emits radiation having a wavelength less than 400 nm, characterised in that the reactor walls allow water and the pollutant substances to pass through.

These walls can consist either of a mesh with suitably sized apertures or a semipermeable membrane. The apertures or pores which characterise the reactor walls are of such dimensions as to prevent the escape of catalyst while allowing water and pollutant substances to flow through. As the pollutants reach the reactor interior they are initially adsorbed on the catalyst activated by the light radiation and are then degraded.

Semiconductors are materials having a particular electronic configuration, namely that the valence band at the lower energy level is completely occupied by electrons, whereas the conduction band at the higher level is almost completely empty. By irradiation with light of a suitable wavelength the electrons acquire sufficient energy to transfer to the conduction level. In this manner charges are separated and migrate to the surface of the semiconductor where they are are able to induce oxidation-reduction reactions. This behaviour, which is typical of semiconductors, has found its most important application in water purification, in which it is used to obtain heterogeneous catalytic photodegradation of micropollutants.

In particular, a very wide range of highly toxic compounds can be completely mineralized, i.e. degraded to $CO_2$ and water, by heterogeneous photocatalysis.

Various types of photochemical reactors have been used to implement this purification method.

The most widespread is the immersion type and consists substantially of a conventional chemical reactor into which a suitable lamp is inserted through the cover and immersed into the reaction mixture, which also contains the catalyst particles in suspension. These particles form suspensions or colloidal solutions from which they have to be recovered on termination of the degradation process in order to be recycled and to leave the water as pure as possible.

This removal is achieved by decantation or centrifuging, but the water obtained in this manner still contain up to 1 mg/l of catalyst and although being dischargeable is above the allowable limit for drinking water.

It has been sought to solve this problem by using supported catalysts, for example on glass.

However this type of catalyst has a very much smaller surface area than the preceding, and moreover because of its low mechanical strength tends to crumble and release a part of the powder, which as in the aforegoing case must be separated. U.S. patent application Ser. No. 521,357 describes a method for the photocatalytic treatment of aqueous pollutant mixtures which as catalyst uses titanium dioxide in the form of microbeads, which are kept under agitation within the reactor by the reactant mixture flow, but without being removed.

As the catalyst remains confined to the reactor interior the water purification and catalyst recovery steps are no longer required on termination of the photocatalytic treatment. In addition these microbeads have high mechanical strength and do not release $TiO_2$ powder, in spite of the stresses to which they are subjected during the process.

The complexity of the synthesis method however makes them more costly than the corresponding powder-form catalyst.

We have now found a method for purifying water containing pollutant mixtures which consists of immersing into said water a reactor containing a semiconductor and a lamp which emits radiation having a wavelength less than 400 nm, characterised in that the reactor walls allow water and the pollutant substances to pass through. These walls can consist either of a mesh with suitably sized apertures or a semipermeable membrane. In this manner a space is defined about the lamp to hold the photodegradation catalyst, the particle size of this latter being chosen according to the size of the apertures or pores in the reactor wall. The pollutants pass through these walls to reach the catalyst, on which they are adsorbed and then degraded.

Because of the manageability and easy transportability of the reactor and the fact that the catalyst is contained in an enclosed space, this method can be used to purify polluted water directly in the natural basin which contains it, so avoiding the high cost involved in withdrawing large volumes of polluted mixture and transporting it to a photodegradation plant. A particular preferred aspect of the present invention is the use of a reactor formed from a semipermeable membrane, which thus allows a catalyst in the form of a powder-form semiconductor in colloidal dispersion to be used.

The process therefore becomes particularly economical and convenient, and without encountering the separation problems of the known photodegradation methods of the prior art. The lamps used in the process of the present invention emit radiation having a wavelength of less than 400 nm and preferably between 320 and 380 nm, and can for example be high or low pressure mercury vapour or xenon lamps.

The distance between the reactor wall exceeds 0.5 cm and is preferably between 0.5 and 5.0 cm.

Semiconductors which can be used as catalysts include titanium dioxide and zinc oxide. These catalysts are dispersed in water and can be in the form of powder or microbeads.

The semipermeable membranes used to form the reactor walls are characterised by a cut-off of between 1000 and 50,000 u.m.a. These membranes consist for example of modified cellulose or synthetic polymers.

The mesh used in the present invention can be either metal or plastics mesh, and its aperture dimensions are chosen in relation to the size of the catalyst particles. The apertures can for example have a diameter of between 0.1 and 1 mm.

If the reactor is formed from a semipermeable membrane, suitable catalysts are semiconductors in the form of particles of size between 1 and 100 $\mu$m, in a concentration of between 0.5 and 50 g/l. Such particles are unable to pass through the membrane pores or to obstruct them.

If the reactor walls are of mesh form, the catalyst used is preferably a semiconductor in the form of microbeads, prepared for example in accordance with U.K. Patent No. 2.112.764. These microbeads can also be used for membrane reactors. Air or oxygen can be blown into the reactor during the process.

EXAMPLE 1

50 ml of an aqueous solution containing 104 ppm of o-nitrophenol at pH 6 are placed in a 100 ml cylinder. A reactor formed from a membrane of length 18 cm and diameter 2.1 cm and having a cut-off of 15,000 u.m.a. is immersed in this solution, the reactor containing a colloidal dispersion comprising 4 g/l of powdered $TiO_2$ and a 40 W low pressure mercury vapour lamp. Air is blown into the membrane interior. After 30 minutes in the dark the o-nitrophenol concentration within the membrane is 52 ppm. After 2 hours of irradiation the pollutant concentration both within and outside the membrane has fallen to 8 ppm.

EXAMPLE 2

The procedure of the preceding example was followed, but the catalyst concentration was reduced to 1 g/l. After 30 minutes in the dark the o-nitrophenol concentration within the membrane is 46 ppm.

After 1 hour of irradiation the pollutant concentration has fallen to 18 ppm.

EXAMPLE 3

600 ml of an aqueous solution containing 52 mg/l of o-nitrophenol were processed under the conditions of the preceding example. The concentration of the catalyst within the membrane is 50 g/l. The following table shows the results obtained:

| t (min) | concentration (ppm) |
| --- | --- |
| 0 | 39 |
| 60 | 33 |
| 105 | 30 |
| 165 | 24 |
| 330 | 14 |

EXAMPLE 4

As Example 2 but with a catalyst concentration of 0.6 g/l within the membrane.

After 30 minutes in the dark the o-nitrophenol concentration within the reactor is 50 ppm.

After 1 hour the concentration has fallen to 42 ppm and after 3 hours to 32 ppm.

EXAMPLE 5

500 ml of an aqueous mixture deriving from a chemical industry effluent were processed under the conditions of the preceding example. The following table shows the results obtained:

| time (hours) | COD |
| --- | --- |
| 0 | 4900 |
| 1 | 4700 |
| 2 | 4500 |
| 6 | 4200 | where
COD = chemical oxygen demand, i.e. mg/l of $O_2$ required to oxidize the organic material contained in the reaction mixture.

EXAMPLE 6

500 ml of an aqueous mixture of pollutants is processed under the conditions of the preceding example. 1.2 g/l of $TiO_2$ in colloidal dispersion are contained within the membrane. The following table shows the results obtained:

| time (hours) | COD |
| --- | --- |
| 0 | 140 |
| 1 | 125 |
| 3 | 66 |
| 6 | 30 |

EXAMPLE 7

A reactor formed from a mesh of length 18 cm and diameter 2.5 cm and with apertures of 0.25 mm diameter is immersed in 500 ml of an aqueous mixture having a COD of 50, the reactor containing 10 g of $TiO_2$ in the form of microbeads prepared as described in U.K. Patent 2.112.764 and a 40 W low pressure mercury vapour lamp. After 30 minutes in the dark the mixture is irradiated, the results obtained being shown in the following table:

| time (hours) | COD |
| --- | --- |
| 0 | 50 |
| 1 | 43 |
| 3 | 34 |
| 6 | 30 |
| 7 | 22 |
| 9 | 12 |

We claim:

1. A method for purifying water containing a pollutant, consisting of immersing into said water a reactor containing a semiconductor and a lamp which emits radiation having a wavelength less than 400 nm, characterized in that the reactor walls allow water and the pollutant substances to pass through, wherein the semiconductor is dispersed in water.

2. A method as claimed in claim 1, wherein the reactor walls consist of a semipermeable membrane.

3. A method as claimed in claim 1, wherein the reactor walls consist of a mesh.

4. A method as claimed in claim 1, wherein the lamp used emits at least a fraction of radiation at a wavelength of between 380 and 320 nm.

5. A method as claimed in claim 1, wherein the lamp is a high pressure mercury vapour or xenon arc lamp or a low pressure mercury vapour or xenon arc lamp.

6. A method as claimed in claim 1, wherein the semiconductor is chosen from titanium dioxide and zinc oxide.

7. A method as claimed in claim 1, wherein the distance between the lamp and the reactor wall exceeds 0.5 cm.

8. A method as claimed in claim 2, wherein the membrane is characterised by a cut-off of between 1000 and 50,000 u.m.a.

9. A method as claimed in claim 2, wherein the membrane is of modified cellulose or synthetic polymers.

10. A method as claimed in claim 3, wherein the mesh is characterised by apertures having a diameter of between 0.1 and 1 mm.

11. A method as claimed in claim 3, wherein the mesh is of plastics material or metal.

12. A method as claimed in claim 1, wherein the semiconductor is dispersed in water, and is in the form of powder or microbeads.

13. A method as claimed in claim 7, wherein the distance between the lamp and the reactor wall is between 0.5 and 5 cm.

14. An apparatus for purifying water containing a pollutant in accordance with claim 1, consisting of a reactor containing a semiconductor and a lamp which emits radiation of less than 400 nm wavelength, characterized in that its walls allow water and the pollutant substances to pass through, wherein the semiconductor is dispersed in water.

* * * * *